United States Patent
Park

(10) Patent No.: US 10,195,943 B1
(45) Date of Patent: Feb. 5, 2019

(54) INSTRUMENT CLUSTER FOR VEHICLE

(71) Applicants: Hyundai Motor Company, Seoul (KR); Kia Motors Corporation, Seoul (KR)

(72) Inventor: Chong Bae Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/855,630

(22) Filed: Dec. 27, 2017

(30) Foreign Application Priority Data

Oct. 13, 2017 (KR) .................. 10-2017-0133062

(51) Int. Cl.
  *B60Q 3/14* (2017.01)
  *B60Q 3/60* (2017.01)
  *B60K 35/00* (2006.01)
  *B60K 37/02* (2006.01)

(52) U.S. Cl.
  CPC ............. *B60K 37/02* (2013.01); *B60K 35/00* (2013.01); *B60Q 3/14* (2017.02); *B60Q 3/60* (2017.02); *B60K 2350/2039* (2013.01)

(58) Field of Classification Search
  CPC ...... G01D 11/28; G01D 13/265; G01D 13/18; G01D 13/28; B60K 2350/408; B60K 35/00; B60Q 1/00
  See application file for complete search history.

(56) References Cited

U.S. PATENT DOCUMENTS

| | | | |
|---|---|---|---|
| 6,863,411 | B2 | 3/2005 | Furuya |
| 2007/0126567 | A1* | 6/2007 | Fournier ............... B60K 37/02 340/461 |

FOREIGN PATENT DOCUMENTS

| | | |
|---|---|---|
| JP | H05-248896 A | 9/1993 |
| JP | H07-42101 Y2 | 9/1995 |
| JP | 2004-045131 A | 2/2004 |
| JP | 2005-164282 A | 6/2005 |

* cited by examiner

*Primary Examiner* — Omeed Alizada
(74) *Attorney, Agent, or Firm* — Mintz Levin Cohn Ferris Glovsky and Popeo, P.C.; Peter F. Corless

(57) ABSTRACT

An instrument cluster for a vehicle includes a display panel including a surface light-emitting display portion, a pointer disposed under the display panel and configured to divide the surface light-emitting display portion into a light-emitting region and a non-light-emitting region, a rotary shaft unit for rotating the pointer so that the pointer moves in the longitudinal direction of the surface light-emitting display portion, and an illumination unit disposed under the rotary shaft unit to emit light to an interior of the pointer. The pointer includes a straight bar extending a predetermined length across the surface light-emitting display portion, and a bent bar bent at the distal end of the straight bar and disposed outward of the surface light-emitting display portion.

18 Claims, 4 Drawing Sheets

INSTRUMENT CLUSTER FOR VEHICLE

CROSS-REFERENCE TO RELATED APPLICATION

This application claims under 35 U.S.C. § 119(a) the benefit of Korean Patent Application No. 10-2017-0133062, filed on Oct. 13, 2017, the entire contents of which are incorporated by reference herein.

BACKGROUND

(a) Technical Field

The present disclosure relates to a vehicle, and more particularly, to an instrument cluster that is mounted to the interior of a vehicle.

(b) Description of the Related Art

In general, an instrument cluster is mounted to a front portion of an instrument panel in front of a driver's seat of a vehicle, and various instruments, such as a speedometer, a tachometer, a thermometer, a fuel gauge, etc., are provided in the instrument cluster so that the driver may check information necessary for driving the vehicle at all times.

The instrument cluster includes display units for displaying different states of the vehicle, such as a speed of the vehicle, an engine RPM, a temperature of coolant, a quantity of fuel, and the like. Each of the display units has a pointer for enabling the driver to visually recognize the applicable state of the vehicle.

This instrument cluster may take the form of an analog type or a digital type. The analog-type instrument cluster is more commonly used than the digital-type instrument cluster. The analog-type instrument cluster includes gradations formed equidistantly along the circumference thereof and a pointer rotatably provided therein to indicate the gradations.

The instrument cluster is provided therein with an illumination device so that the driver or the passenger may easily check state(s) of the vehicle through the pointer when driving at night or when the interior of the vehicle is dark.

As the illumination device for providing light for the display unit and the pointer of the instrument cluster, a light-emitting diode (LED) is widely used. The illumination device makes the pointer, which indicates the gradations, brighter and more visible to the driver.

SUMMARY

Accordingly, the present disclosure is directed to an instrument cluster for a vehicle.

An object of the present disclosure is to provide an instrument cluster for a vehicle, which may make a pointer of the instrument cluster much more visible and may generate a three-dimensional effect, thereby enabling a driver to more quickly recognize a state of the vehicle.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an instrument cluster for a vehicle includes a display panel including a surface light-emitting display portion, a pointer disposed under the display panel and configured to divide the surface light-emitting display portion into a light-emitting region and a non-light-emitting region, a rotary shaft unit for rotating the pointer so that the pointer moves in a longitudinal direction of the surface light-emitting display portion, and an illumination unit disposed under the rotary shaft unit to emit light to an interior of the pointer, wherein the pointer includes a straight bar extending a predetermined length across the surface light-emitting display portion, and a bent bar bent at a distal end of the straight bar and disposed outward of the surface light-emitting display portion.

The pointer may further include reflective plates stamped on an outward surface of the straight bar and an outward surface of the bent bar, the outward surface of the straight bar and the outward surface of the bent bar being oriented to the non-light-emitting region.

The reflective plates may include a first reflective plate disposed on the outward surface of the straight bar, and a second reflective plate disposed on the outward surface of the bent bar while being spaced apart from the first reflective plate.

The reflective plates may further include a third reflective plate stamped on bottom surfaces of the straight bar and the bent bar.

The pointer may be formed of a transparent material.

The display panel may include a state display portion for displaying the engine RPM, and the state display portion may be provided with numbers arranged along a semicircular path from a lowermost point thereof to an uppermost point thereof in the clockwise direction such that numbers from 0 to 8 corresponding to 0×1,000 RPM to 8×1,000 RPM, respectively, sequentially increase.

The angle at which the pointer is bent may be set to a value at which, when the pointer indicates 5,000 RPM in the state display portion, the light-emitting region of the surface light-emitting display portion is illuminated with the greatest luminous intensity.

The angle at which the pointer is bent may be in the range from 110° to 130°.

The straight bar and the bent bar may have the same thickness in the horizontal direction.

The straight bar may be formed such that the thickness thereof in the vertical direction gradually decreases from the portion thereof that is coupled to the rotary shaft unit to the distal end thereof.

The display panel may further include a gradation display portion, and the surface light-emitting display portion may be disposed adjacent to one side of the gradation display portion.

The straight bar may have a length sufficient to reach the gradation display portion.

The display panel may further include a state display portion disposed adjacent to the opposite side of the gradation display portion.

The bent bar may be disposed within a region between the state display portion and the surface light-emitting display portion.

The state display portion may display at least one of the speed of a vehicle, the engine RPM, the temperature, and the quantity of fuel.

The instrument cluster may further include a lighting box coupled to the display panel to form a light room or a dark room, and the pointer may be mounted in the lighting box.

The lighting box may include a bottom portion positioned under the pointer so that the pointer implements a sliding motion thereon, and a side wall portion extending vertically at the peripheral edge of the bottom portion to form a space surrounded thereby, the side wall portion being coupled to the display panel.

The pointer may further include a light-receiving portion for allowing light emitted from the illumination unit to be refracted and introduced into the pointer therethrough.

In another aspect of the present disclosure, an instrument cluster for a vehicle includes a display panel including a surface light-emitting display portion, a pointer including a straight bar and a bent bar bent at a distal end of the straight bar and disposed outward of the surface light-emitting display portion, the pointer being disposed under the display panel and configured to divide the surface light-emitting display portion into a light-emitting region and a non-light-emitting region, a rotary shaft unit for rotating the pointer so that the pointer moves in a longitudinal direction of the surface light-emitting display portion, an illumination unit disposed under the rotary shaft unit to emit light to an interior of the pointer, a first reflective plate disposed on an outward surface of the straight bar, a second reflective plate disposed on an outward surface of the bent bar while being spaced apart from the first reflective plate, and a third reflective plate disposed on bottom surfaces of the straight bar and the bent bar.

The display panel may include a state display portion for displaying the engine RPM, and the state display portion may be provided with numbers arranged along a semicircular path from a lowermost point thereof to an uppermost point thereof in a clockwise direction such that numbers from 0 to 8 corresponding to 0×1,000 RPM to 8×1,000 RPM, respectively, sequentially increase.

The angle at which the pointer is bent may be set to a value at which, when the pointer indicates 5,000 RPM in the state display portion, the light-emitting region of the surface light-emitting display portion is illuminated with the greatest luminous intensity.

The angle at which the pointer is bent may be in the range from 110° to 130°.

The instrument cluster may further include a lighting box coupled to the display panel to form a light room or a dark room, and the pointer may be mounted in the lighting box.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
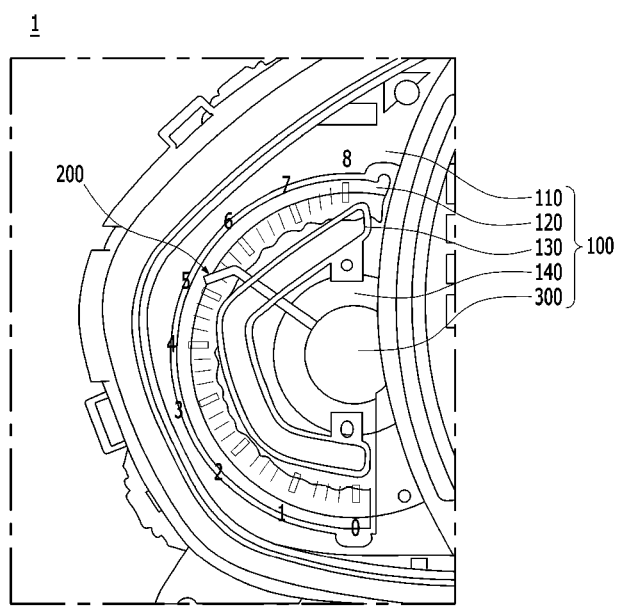
FIG. 1 illustrates an instrument cluster for a vehicle according to an embodiment of the present disclosure in a non-illuminated state.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments will be clearly understood from the attached drawings and the description associated with the embodiments. In the description of the embodiments, it will be understood that when an element, such as a layer (film), a region, a pattern or a structure, is referred to as being "on" or "under" another element, such as a substrate, a layer (film), a region, a pad or a pattern, the term "on" or "under" means that the element is "directly" on or under another element or is "indirectly" formed such that an intervening element may also be present. In addition, it will also be understood that the criteria of "on" or "under" is on the basis of the drawings.

In the drawings, elements may be exaggerated in size, omitted or schematically illustrated for convenience in description and clarity. Further, the sizes of elements do not indicate the actual sizes of the elements. Wherever possible, the same reference numbers will be used throughout the drawings to refer to the same parts. Hereinafter, exemplary embodiments will be described with reference to the accompanying drawings.

Figure 2:
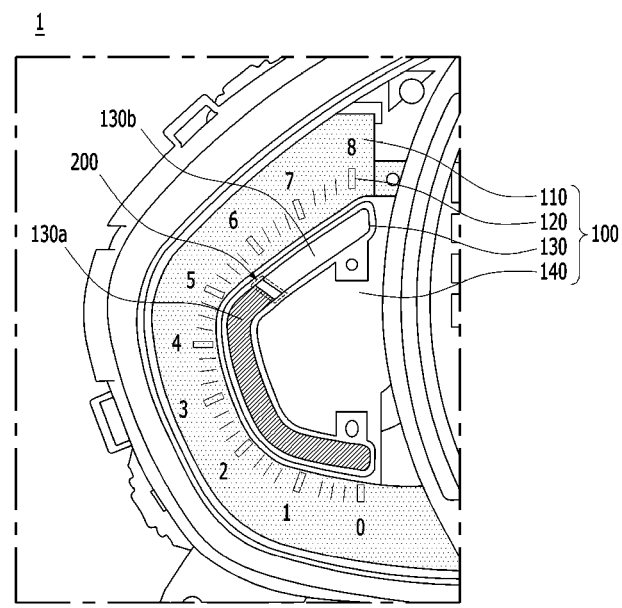
FIG. 2 illustrates the instrument cluster for a vehicle depicted in FIG. 1 in an illuminated state.
Figure 3:
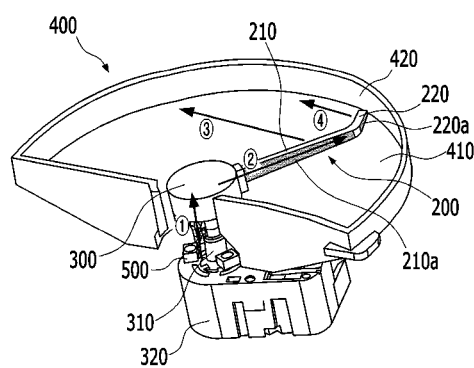
FIG. 3 is a perspective view of a lighting box, which is disposed under a display panel depicted in FIG. 2.

FIG. 1 illustrates an instrument cluster for a vehicle according to an embodiment of the present disclosure in a non-illuminated state, FIG. 2 illustrates the instrument cluster for a vehicle depicted in FIG. 1 in an illuminated state, and FIG. 3 is a perspective view of a lighting box, which is disposed under the display panel depicted in FIG. 2.

As shown in FIGS. 1 to 3, an instrument cluster 1 for a vehicle according to the embodiment may include a display panel 100, a pointer 200, a rotary shaft unit 300, an illumination unit 500, and a lighting box 400.

The display panel 100 may display one or more states of the vehicle to the driver or the passenger. The display panel 100 may be formed of transparent material so that various kinds of information about the state(s) of the vehicle may be displayed therethrough.

For example, the display panel 100 may display information about at least one of a speed of the vehicle, an engine RPM, a temperature, and a quantity of fuel. To this end, the display panel 100 may include a state display portion 110, a gradation display portion 120, and a surface light-emitting display portion 130.

The state display portion 110 serves to enable the driver to recognize the kind of information displayed on the instrument cluster 1, i.e., the speed of the vehicle, the engine RPM, the temperature, or the quantity of fuel. For example, as shown in FIGS. 1 and 2, the state display unit 110 of the instrument cluster 1 may be configured to display the engine RPM of the vehicle. In this case, the state display portion 110 may be provided with numbers, which are arranged along a semi-circular path from the lowermost point thereof to the uppermost point thereof in the clockwise direction such that numbers from 0 to 8 corresponding to 0×1,000 RPM to 8×1,000 RPM, respectively, sequentially increase.

In the case of the state display portion 110 for displaying a temperature, the state display portion 110 may include "C" and "H". In the case of the state display portion 110 for displaying the quantity of fuel, the state display portion 110 may include "E" and "F". As such, the driver is able to recognize whether the kind of the instrument cluster 1 is a thermometer, a tachometer or a fuel gauge through the state display portion 110.

The gradation display portion 120 may include gradations, which are arranged equidistantly so that the driver may recognize the information, displayed on the state display portion 110, with numbers or ranges. The gradation display portion 120 may be disposed beside the state display portion 110. For example, the gradation display portion 120 may include gradations, which are arranged equidistantly such that a predetermined number thereof is disposed between neighboring numbers of the state display portion 110.

The surface light-emitting display portion 130 may be disposed adjacent to the gradation display portion 120, and may be configured to have a predetermined width and a predetermined length so as to display the state of the vehicle to the driver through surface light emission. When the surface light-emitting display portion 130 performs light emission, as shown in FIG. 2, the surface light-emitting display portion 130 may be divided into a light-emitting region 130a and a non-light-emitting region 130b. The surface light-emitting display portion 130 may show the information of the vehicle, displayed on the state display portion 110, to the driver in the form of a graph through the light-emitting region 130a. For example, the surface light-emitting display portion 130 may be formed in the shape of a bar or band that is disposed adjacent to the gradation display portion 120 so as to extend in the longitudinal direction of the gradation display portion 120.

The display panel 100 may further include a light-blocking portion 140 for blocking light, which is disposed in a region of the display panel 100 other than the regions occupied by the state display portion 110, the gradation display portion 120 and the surface light-emitting display portion 130.

The pointer 200 may be disposed under the display panel 100 and may divide the surface light-emitting display portion 130 into the light-emitting region 130a and the non-light-emitting region 130b. For example, the pointer 200 may be formed in the shape of a thin needle that has a predetermined length. The pointer 200 may be configured such that only a portion thereof that is located at the boundary between the light-emitting region 130a and the non-light-emitting region 130b is exposed. A detailed explanation of the configuration of the pointer 200 according to the embodiment will be made later.

The rotary shaft unit 300 serves to rotate the pointer 200 so that the pointer 200 may move in the longitudinal direction of the surface light-emitting display portion 130. The rotary shaft unit 300, as shown in FIG. 3, may include a rotary shaft 310, which is configured to be rotated by a motor 320. The pointer 200 may be coupled to a portion of the rotary shaft unit 300. For example, the motor 320 may be a stepping motor. Therefore, the position of the pointer 200 may be changed in a manner such that the pointer 200 rotates at a predetermined angle in the leftward-and-rightward direction about the rotary shaft unit 300.

The illumination unit 500, as shown in FIG. 3, may be disposed under the rotary shaft unit 300 and may emit light so that the light may travel to the interior of the pointer 200. For example, the illumination unit 500 may include a plurality of LEDs, which are arranged so as to surround the rotary shaft 310 of the rotary shaft unit 300.

The LEDs may be configured to emit light of various colors. The light emitted from the illumination unit 500 travels along the following paths: a path ① from the bottom of the rotary shaft unit 300 to the top thereof, a path ② from the top of the rotary shaft unit 300 to the pointer 200, and paths ③ and ④ from one side surface of the pointer 200 to the light-emitting region 130a of the surface light-emitting display portion 130. A detailed explanation thereof will be made later.

The lighting box 400 may accommodate the pointer 200 and the rotary shaft unit 300, and may be coupled to the display panel 100. For example, the lighting box 400 may include a bottom portion 410 and a side wall portion 420.

The bottom portion 410 may be positioned under the pointer 200 so that the pointer 200 may implement a sliding motion thereon. Therefore, when the pointer 200 is rotated in the leftward-and-rightward direction by the rotary shaft unit 300, the pointer 200 may stably move along the bottom portion 410 of the lighting box 400.

The side wall portion 420 may extend vertically at the peripheral edge of the bottom portion 410 and may form a space surrounded thereby. The pointer 200 and the rotary shaft unit 300 may be accommodated in the space in the lighting box 400. The space may be divided into a light room, in which light is reflected, and a dark room, in which light is blocked, in accordance with the movement of the pointer 200.

The top of the side wall portion 420 may be coupled to the display panel 100. Therefore, in accordance with the division of the lighting box 400 into the light room and the dark room, the surface light-emitting display portion 130 of the display panel 100 may also be divided into the light-emitting region 130a and the non-light-emitting region 130b.

Figure 4:
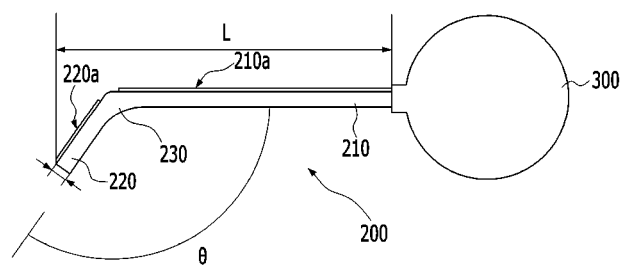
FIG. 4 is a plan view of a pointer region in FIG. 3.
Figure 5:
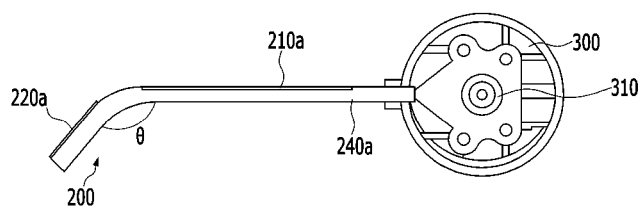
FIG. 5 is a rear view of FIG. 4.
Figure 6:
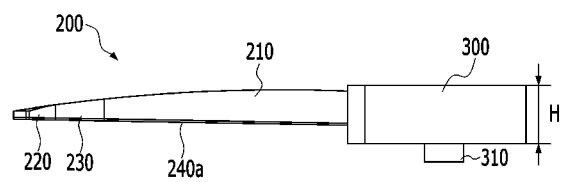
FIG. 6 is a left side view of FIG. 4.
Figure 7:
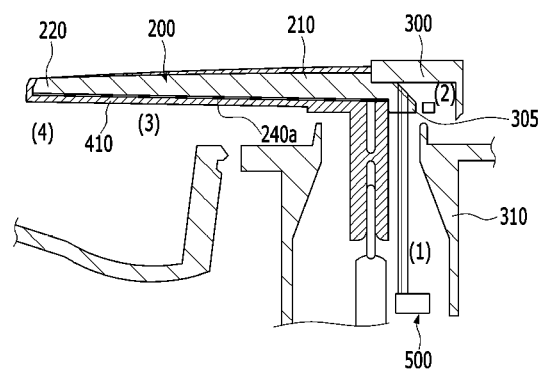
FIG. 7 is a longitudinal-sectional view of FIG. 6, which shows the path along which light travels within a pointer.

FIG. 4 is a plan view of the pointer region in FIG. 3, FIG. 5 is a rear view of FIG. 4, FIG. 6 is a left side view of FIG. 4, and FIG. 7 is a longitudinal-sectional view of FIG. 6, which shows the path along which light travels within the pointer.

A detailed description of the configuration of the pointer 200 will now be made.

As shown in FIGS. 4 to 7, the pointer 200 may include a straight bar 210, which has therein an empty space and extends a predetermined length, and a bent bar 220, which is bent at the distal end of the straight bar 210. The pointer 200 may be formed of a transparent material. Therefore, the pointer 200 has a structure that allows light to pass therethrough or to be diffused therefrom.

The straight bar 210 may be formed so as to have a constant thickness t1 in the horizontal direction and to extend a predetermined length from the rotary shaft unit 300 in the radial direction. As shown in FIG. 6, the straight bar 210 may be formed such that the thickness thereof in the vertical direction gradually decreases from the portion thereof that is coupled to the rotary shaft unit 300 to the distal end thereof.

As described above, the straight bar 210 is coupled at one end portion thereof to the rotary shaft unit 300. Therefore, as shown in FIGS. 1 and 2, the straight bar 210 may be disposed so as to extend across the surface light-emitting display portion 130. The straight bar 210 may have a length sufficient to reach the gradation display portion 120. For example, the straight bar 210 may have a length such that the distal end thereof is located within a region from the boundary between the gradation display portion 120 and the surface light-emitting display portion 130 to the boundary between the gradation display portion 120 and the state display portion 110.

The bent bar 220 may be bent at the distal end of the straight bar 210 and may have a constant thickness t1 in the horizontal direction, which is equal to the thickness of the straight bar 210. The bent bar 220 may be disposed outward of the surface light-emitting display portion 130. For example, the bent bar 220 may have a length such that the distal end thereof is located within a region from the boundary between the gradation display portion 120 and the surface light-emitting display portion 130 to the state display portion 110.

As such, the pointer 200 may be formed such that the distal end portion thereof is bent in an "L" shape, rather than extending straight. This shape of the pointer 200 prevents the quantity of light from decreasing from the portion of the pointer 200 that is coupled to the rotary shaft unit 300 to the distal end thereof, thereby collecting a sufficient amount of light in the distal end portion of the pointer 200.

For example, the angle at which the pointer 200 is bent may be in the range from 110° to 130°. The bent angle may be set to a value at which, when the state display portion 110 displays an engine RPM and the pointer 200 indicates the number "5" (i.e. 5,000 RPM) in the state display portion 110, the light-emitting region 130a from 0 to 5,000 RPM is illuminated with the greatest luminous intensity (the brightest level). For example, the angle at which the pointer 200 is bent may be 112.5°, 124°, or the like depending on the vehicle model.

The pointer 200 may further include reflective plates 210a, 220a and 240a, which are stamped on the outward surface of the straight bar 210 and the outward surface of the bent bar 220.

The reflective plates 210a, 220a and 240a serve to reflect light that passes through the interior of the pointer 200, thereby adjusting the paths of light and collecting light in a predetermined portion.

For example, the reflective plates 210a, 220a and 240a, as shown in FIGS. 3 and 4, may include a first reflective plate 210a, which is disposed on the outward surface of the straight bar 210, and a second reflective plate 220a, which is disposed on the outward surface of the bent bar 220 while being spaced apart from the first reflective plate 210a.

In addition, the reflective plates 210a, 220a and 240a, as shown in FIG. 5, may further include a third reflective plate 240a, which is stamped on the bottom surfaces of the straight bar 210 and the bent bar 220.

Therefore, as shown in FIGS. 3 and 7, the light, which travels through the illumination unit 500, may be refracted and introduced into the pointer 200 through a light-receiving portion 305 of the pointer 200. For example, the light-receiving portion 305 may include a prism.

The first reflective plate 210a and the second reflective plate 220a, which are disposed on the outward surface of the pointer 200 (the right side in FIGS. 1 to 3), may prevent the light introduced into the pointer 200 from traveling in the rightward direction of the pointer 200, but may allow the light to be diffused through the inward surface of the pointer 200 (the left side in FIGS. 1 to 3).

Therefore, the region to which the inward surface (the left side) of the pointer 200 is oriented may be the light room or the light-emitting region 130a, and the region to which the outward surface (the right side) of the pointer 200 is oriented may be the dark room or the non-light-emitting region 130b.

As is apparent from the above description, the present disclosure provides an instrument cluster for a vehicle, which may make a pointer brighter by forming a bent portion at the pointer and may illuminate an entire range below the level indicated by the pointer through a surface light-emitting display portion, thereby enhancing visibility and enabling a driver to more quickly recognize state(s) of a vehicle.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An instrument cluster for a vehicle, the instrument cluster comprising:
   a display panel including a surface light-emitting display portion;
   a pointer disposed under the display panel and configured to divide the surface light-emitting display portion into a light-emitting region and a non-light-emitting region;
   a rotary shaft unit for rotating the pointer so that the pointer moves in a longitudinal direction of the surface light-emitting display portion; and an illumination unit disposed under the rotary shaft unit to emit light to an interior of the pointer,
wherein the pointer includes a straight bar extending a predetermined length across the surface light-emitting display portion, and a bent bar bent at a distal end of the straight bar and disposed outward of the surface light-emitting display portion,
wherein the pointer further includes reflective plates stamped on an outward surface of the straight bar and an outward surface of the bent bar, the outward surface of the straight bar and the outward surface of the bent bar being oriented to the non-light-emitting region, and
wherein the reflective plates include:
a first reflective plate disposed on the outward surface of the straight bar;
a second reflective plate disposed on the outward surface of the bent bar while being spaced apart from the first reflective plate; and
a third reflective plate stamped on bottom surfaces of the straight bar and the bent bar.

2. The instrument cluster according to claim 1, wherein the display panel includes a state display portion for displaying an engine RPM, and
wherein the state display portion is provided with numbers arranged along a semi-circular path from a lowermost point thereof to an uppermost point thereof in a clockwise direction such that numbers from 0 to 8 corresponding to 0×1,000 RPM to 8×1,000 RPM, respectively, sequentially increase.

3. The instrument cluster according to claim 2, wherein an angle at which the pointer is bent is set to a value at which, when the pointer indicates 5,000 RPM in the state display portion, the light-emitting region of the surface light-emitting display portion is illuminated with greatest luminous intensity.

4. The instrument cluster according to claim 3, wherein the angle at which the pointer is bent is in a range from 110° to 130°.

5. The instrument cluster according to claim 4, wherein the straight bar and the bent bar have a same thickness in a horizontal direction.

6. The instrument cluster according to claim 5, wherein the straight bar is formed such that a thickness thereof in a vertical direction gradually decreases from a portion thereof that is coupled to the rotary shaft unit to a distal end thereof.

7. The instrument cluster according to claim 1, wherein the display panel further includes a gradation display portion, and
wherein the surface light-emitting display portion is disposed adjacent to one side of the gradation display portion.

8. The instrument cluster according to claim 7, wherein the straight bar has a length sufficient to reach the gradation display portion.

9. The instrument cluster according to claim 8, wherein the display panel further includes a state display portion disposed adjacent to an opposite side of the gradation display portion, and
wherein the state display portion displays at least one of a speed of a vehicle, an engine RPM, a temperature, and a quantity of fuel.

10. The instrument cluster according to claim 9, wherein the bent bar is disposed within a region between the state display portion and the surface light-emitting display portion.

11. The instrument cluster according to claim 10, further comprising:
a lighting box coupled to the display panel to form a light room or a dark room,
wherein the pointer is mounted in the lighting box.

12. The instrument cluster according to claim 11, wherein the lighting box includes:
a bottom portion positioned under the pointer so that the pointer implements a sliding motion thereon; and
a side wall portion extending vertically at a peripheral edge of the bottom portion to form a space surrounded thereby, the side wall portion being coupled to the display panel.

13. The instrument cluster according to claim 1, wherein the pointer further includes a light-receiving portion for allowing light emitted from the illumination unit to be refracted and introduced into the pointer therethrough.

14. An instrument cluster for a vehicle, the instrument cluster comprising:
a display panel including a surface light-emitting display portion;
a pointer including a straight bar and a bent bar bent at a distal end of the straight bar and disposed outward of the surface light-emitting display portion, the pointer being disposed under the display panel and configured to divide the surface light-emitting display portion into a light-emitting region and a non-light-emitting region;
a rotary shaft unit for rotating the pointer so that the pointer moves in a longitudinal direction of the surface light-emitting display portion;
an illumination unit disposed under the rotary shaft unit to emit light to an interior of the pointer;
a first reflective plate disposed on an outward surface of the straight bar;
a second reflective plate disposed on an outward surface of the bent bar while being spaced apart from the first reflective plate; and
a third reflective plate disposed on bottom surfaces of the straight bar and the bent bar.

15. The instrument cluster according to claim 14, wherein the display panel includes a state display portion for displaying an engine RPM, and
wherein the state display portion is provided with numbers arranged along a semi-circular path from a lowermost point thereof to an uppermost point thereof in a clockwise direction such that numbers from 0 to 8 corresponding to 0×1,000 RPM to 8×1,000 RPM, respectively, sequentially increase.

16. The instrument cluster according to claim 15, wherein an angle at which the pointer is bent is set to a value at which, when the pointer indicates 5,000 RPM in the state display portion, the light-emitting region of the surface light-emitting display portion is illuminated with greatest luminous intensity.

17. The instrument cluster according to claim 16, wherein the angle at which the pointer is bent is in a range from 110° to 130°.

18. The instrument cluster according to claim 17, further comprising:
a lighting box coupled to the display panel to form a light room or a dark room,
wherein the pointer is mounted in the lighting box.

\* \* \* \* \*